United States Patent [19]

Leib et al.

[11] Patent Number: 4,802,718
[45] Date of Patent: Feb. 7, 1989

[54] ONE PIECE FRAME FOR HOLDING A HOLOGRAPHIC ELEMENT IN A HOLOGRAPHIC SYSTEM

[75] Inventors: Kenneth G. Leib, Wantagh; Suey L. Jue, deceased, late of Hicksville, both of N.Y., by Catherine Jue, executrix

[73] Assignee: Grumman Aerospace Corporation, N.Y.

[21] Appl. No.: 903,275

[22] Filed: Sep. 3, 1986

[51] Int. Cl.⁴ .................. G03H 1/04; A47G 1/06; G03B 17/26
[52] U.S. Cl. .................................. 350/3.6; 40/152; 354/276
[58] Field of Search ............... 350/3.6; 40/152, 158 R, 40/158 B, 158.1, 159.2; 354/203, 276

[56] References Cited

U.S. PATENT DOCUMENTS

| | | | |
|---|---|---|---|
| 275,316 | 4/1883 | Wright | 40/152 |
| 587,241 | 7/1897 | Seidel | 40/152 |
| 662,736 | 11/1900 | Prahar | 40/152 |
| 685,695 | 10/1901 | Seymoure | 40/152 |
| 1,262,528 | 4/1918 | Lofland . | |
| 1,291,375 | 1/1919 | Berg | 40/152 |
| 1,775,180 | 9/1930 | Wörsching . | |
| 1,987,058 | 1/1935 | Fuller . | |
| 2,089,236 | 8/1937 | Welsh . | |
| 2,208,642 | 7/1940 | Neuwirth . | |
| 2,268,430 | 12/1941 | Silbernagil . | |
| 2,388,431 | 11/1945 | Neiman | 40/152 |
| 2,823,318 | 2/1958 | Gacki | 354/276 X |
| 3,678,705 | 7/1972 | Korwin | 40/152 X |
| 3,871,752 | 3/1975 | Habinger . | |
| 4,215,890 | 8/1980 | Savage . | |
| 4,302,076 | 11/1981 | Hashimoto . | |
| 4,319,385 | 3/1982 | Marchou . | |

FOREIGN PATENT DOCUMENTS

| | | | |
|---|---|---|---|
| 2907554B1 | 8/1980 | Fed. Rep. of Germany | 350/3.6 |
| 2907555B1 | 8/1980 | Fed. Rep. of Germany | 350/3.6 |
| 669368 | 6/1979 | U.S.S.R. | 354/276 |

Primary Examiner—John K. Corbin
Assistant Examiner—David J. Edmondson
Attorney, Agent, or Firm—Scully, Scott, Murphy & Presser

[57] ABSTRACT

A one piece frame for holding a holographic element in a holographic system, and comprising a border portion, a seating portion, and a plurality of lateral positioning tabs. The border portion forms an outside border of the frame, and is flexible between an open position for receiving the holographic element and a closed position for holding the holographic element in the frame. The seating portion is connected to and extends inward from the border portion to seat against a back surface of the holographic element. The lateral positioning tabs are connected to and extend inward from the border portion, above the seating portion, and are spaced apart from each other along the border portion to hold the holographic element therein spaced from said border portion. The border portion is biased toward the closed position to hold the holographic element against the lateral positioning tabs in a fixed position in, and with a preset angular orientation relative to, the frame, and to cooperate with the holographic element to maintain the frame in a fixed preset shape to facilitate placing and holding the holographic element in a precise location and orientation in the holographic system.

18 Claims, 1 Drawing Sheet

ONE PIECE FRAME FOR HOLDING A HOLOGRAPHIC ELEMENT IN A HOLOGRAPHIC SYSTEM

BACKGROUND OF THE INVENTION

This invention generally relates to frames for holographic elements, and more specifically to a frame particularly designed to facilitate locating holographic recording mediums, holographic lenses and matched filters precisely in position in systems such as holographic recording and correlator systems.

Matched filters are made by exposing holographic recording mediums to certain types of diffraction patterns, and then developing the exposed recording mediums to produce holograms. These filters are used in optical correlator systems by directing certain light beams through the holograms on the matched filters and then processing the output therefrom to detect the presence or absence of a selected target in a scene or field of view. Because very little space is required on a matched filter to store a hologram, it is possible to construct a filter having a large array of holograms, and, for example, a 50 mm×50 mm matched filter may be made with a 100×100 array of holograms.

Such a matched filter may be fabricated using a multiple beam generating holographic lens to generate an array of beams, and directing each of these beams toward a different area on a recording medium to produce an array of diffraction patterns thereon. Such a filter may be employed in an optical correlator system by using a similar or identical holographic lens to generate an array of beams, and directing each of these beams to a different hologram on the matched filter.

To operate the correlator system effectively, it is very important that the matched filter be located, with a very high degree of precision, in a specific position relative to the multiple beam generating holographic lense. Not only is the distance between these two elements critical, but their relative angular orientation and their relative lateral placement are also very important. For instance, the correlator system may be ineffective if the matched filter is laterally placed only 50 to 100 microns away from where it should be relative to the multiple beam generating lense.

The correct relative position of the matched filter and the multiple beam generating lens in the correlator system depends on the position of the recording medium, from which the filter was made, relative to the multiple beam generating lens used to form the array of diffraction patterns on that recording medium. Because of this, in order to use the matched filter properly in the correlator system, it is also highly desirable that the recording medium, from which that filter was made, be located very accurately relative to the multiple beam lens used in the construction of the matched filter.

Holographic systems are known that, with a relatively few adjustments in the components of the system, may be operated both to make a matched filter on a photographic plate, and also as an optical correlator using that filter, and where the correct position of the matched filter in the system, when it is used as a correlator, is identical to the position of the photographic plate form which that matched filter was made. Such systems substantially facilitate determining the correct position of the matched filter; however even with these systems, it is still very important to precisely position the photographic plate in the system, remove it, develop it, and then precisely position the developed matched filter back in the system.

Achieving this very high degree of precision in holographic recording and optical correlator systems is very difficult and time consuming for several reasons. For instance, in these systems, the necessary placement and adjustment of the recording medium, the matched filter, and the mulitple beam generating holographic lens are normally done either in drak or in very low levels of light to minimize any undesirable exposure of the recording medium or the matched filter. Moreover, holographic recording mediums and matched filters usually include glass plate backings that often have rough outside edges, and these rough edges may cause the plates to tilt slightly if they are seated against edges of conventional frames or flat support surfaces. WHile this tilt may be very slight, it may produce a very undesirable deviation in the position of a holographic element. Also, sliding a rough edge of a glass plate against a flat or round pin support surface may cause the whole plate to chip along the edge or to crack.

A SUMMARY OF THE INVENTION

An object of this invention is to provide a simple, low cost frame to locate holographic elements such as holographic recording mediums, lenses, and matched filters accurately in position in holographic processing systems.

Another object of the present invention is to provide a simple, high accuracy, low cost frame for holographic recording mediums so that these mediums can be framed, exposed and processed with accurate indexing, and later, after processing, inserted into a correlator system with comparable indexing accuracy.

Another object of this invention is to provide a frame for holographic optical elements that is very simple and inexpensive to make, and that, for example, may be made in a plastic stamping process.

These and other objects are attained with a one piece frame for holding a holographic element in a holographic system, and comprising a border portion, a seating portion, and a plurality of lateral positioning tabs. The border portion forms an outside border of the frame, and is flexible between an open position for receiving the holographic element, and a closed position for holding the holographic element in the frame. The seating portion is connected to and extends inward from the border portion to seat against a back surface of the holographic element. The lateral positioning tabs are connected to and extend inward from the border portion, above the seating portion, and are spaced apart from each other along the border portion to hold the holographic element therein spaced from said border portion. The border portion is biased toward the closed position to hold the holographic element against the lateral positioning tabs in a fixed position in, and with a preset angular orientation relative to, the frame, and to cooperate with the holographic element to maintain the frame in a fixed preset shape to facilitate placing and holding the holographic element in a precise location and orientation in the holographic system.

The frame of this invention may have any suitable shape, with its shape preferably determined by the shape of the holographic optical element or elements with which the frame is intended for use. The frame may be made from any suitable material, although preferably the frame is made from a material that will withstand the chemicals used to process exposed holographic recording mediums. The frame of this invention may be reused with a number of different holographic elements; but, at the same time, with a preferred embodiment of the frame, a particular holographic element may be easily, permanently connected thereto.

Further benefits and advantages of the invention will become apparent from a consideration of the following detailed description given with reference to the accompanying drawing, which specifies and shows preferred embodiments of the invention.

A BRIEF DESCRIPTION OF THE DRAWING

A DETAILED DESCRIPTION OF THE PREFERRED EMBODIMENTS

Figure 1:
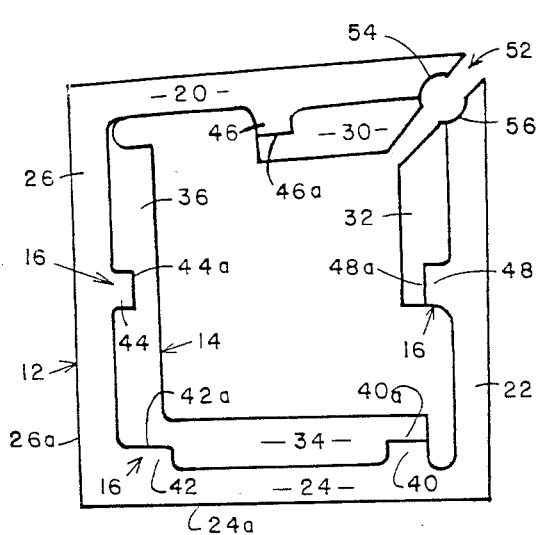
FIG. 1 is a plan view of a typical frame in accordance with the present invention, showing the frame in an open position.

FIGS. 1-4 illustrate holographic frame 10 in accordance with a preferred embodiment of the invention; and, generally, frame 10 comprises border portion 12, seating portion 14, and a plurality of lateral positioning tabs 16. Preferably, border portion 12 includes legs 20, 22, 24 and 26; seating portion 14 includes a plurality of flat, coplanar surfaces 30, 32, 34 and 36; and lateral positioning tabs 16 includes reference tabs 40, 42 and 44 and pressure tabs 46 and 48.

Figure 2:
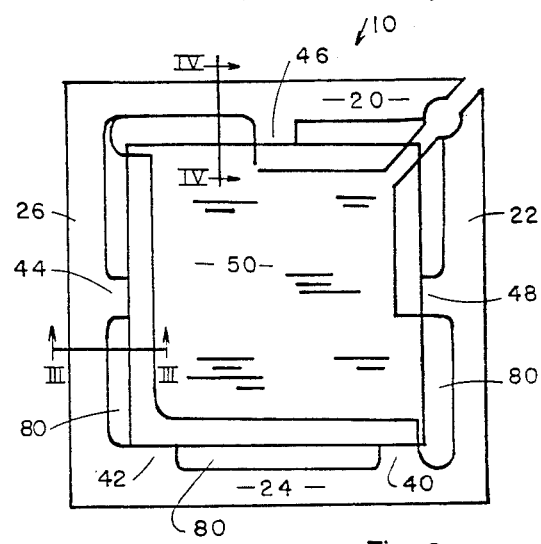
FIG. 2 is a plan view showing the frame of FIG. 1 in a closed position.
Figure 3:
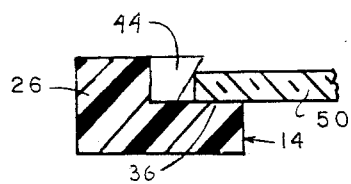
FIG. 3 is an enlarged side cross-sectional view taken along line III—III of FIG. 2.

Border portion 12 forms the outside border or perimeter of frame 10, and is flexible between an open position, shown in FIG. 1, and a closed position, shown in FIG. 2. In the open position, a holographic element 50 may be inserted into and removed from frame 10, and in the closed position, that element is securely held inside the frame. Border portion 12 is biased, for example by its inherent resiliency, toward the closed position to hold holographic element 50 against lateral positioning tabs 16 in a fixed position in, and with a preset angular orientation relative to, frame 10 --that is, a particular axis of element 50 is held in a particular preset angle relative to a particular axis of frame 10. Also border portion 12 cooperates with the holographic element to maintain the frame in a fixed preset shape to facilitate placing and holding the holographic element in a precise location and orientation in a holographic system. Preferably, border portion 12 includes a split 52 to facilitate flexing the border portion between its open and closed positions.

As shown in the drawing, border portion 12 has a flat, square shape, with all four legs 20, 22, 24 and 26 having substantially the same length; and legs 20 and 22 are split apart to form the above-described split 52 in the border portion. Border portion 12 may, though, have shapes and sizes other than as shown in the drawing, and the preferred shape of the border portion generally matches the shape of the holographic plate, matched filter, or other holographic element with which frame 10 is used. For example, the border portion may have a rectangular shape that is not also a square. As used herein and in the uppended claims, the term holographic element includes holographic lenses, matched filters, other devices that actually contain a hologram, and also includes undeveloped photographic plates that may be used to record holograms.

Seating portion 14 is connected to and extends inward from border portion 12 to seat against a back surface of holographic element 50. With the embodiment of the invention shown in the drawing, a back support surface extends inward from each leg of border portion 12. Thus, a first support surface 30 extends inward from leg 20, a second support surface 32 extends inward from leg 22, a third support surface 34 extends inward from leg 24, and a fourth support surface 36 extends inward from leg 26.

Lateral positioning tabs 16 are connected to and extend inward form border portion 12, above seating portion 14, and are spaced apart from each other along that border portion to facilitate positioning and to hold holographic element 50 therein spaced from the border portion itself. More specifically, first and second reference tabs 40 and 42 extend inward from border portion 12 to engage a first side of holographic element 50, and third reference tab 44 extends inward from the border portion to engage a second side of the holographic element. First pressure tab 46 extends inward from border portion 12 to engage holographic element 50 opposite reference tabs 40 and 42 and to force the holographic element against those tabs, and second pressure tabs 48 extends inward from the border portion to engage the holographic element opposite reference tab 44 and to force the holographic element against that tab. In order to balance the forces applied to holographic element 50 by the lateral positioning tabs, preferably pressure tab 46 is symmetrically positioned opposite reference tabs 40 and 42, and pressure tab 48 is directly opposite reference tab 44.

With the preferred embodiment of the invention illustrated in the drawing, where border portion 12 includes four legs 20, 22, 24 and 26, first and second reference tabs 40 and 42 extend inward from leg 24, equally spaced from the center of the longitudinal axis of that leg, and third reference tab 44 extends inward from leg 26, midway along its longitudinal axis. Also, first pressure tab 46 extends inward from leg 20, midway between first and second reference tabs 40 and 42, and second pressure tab 48 extends inward from leg 22, directly opposite third reference tab 44. In addition, with this preferred arrangement, support surface 30 laterally projects directly inward of pressure tab 46, support surface 32 laterally projects directly inward of pressure tab 48, support surface 34 laterally projects directly inward of first and second reference tabs 40 and 42, and support surface 36 laterally projects directly inward of third reference tab 44. Further, preferably the inside surfaces 40a, 42a, 44a, 46a and 48a of the reference and pressure tabs that directly engage optical element 50 are flat and smooth, inside surfaces 40a and 42a of tabs 40 and 42 are also co-planar, and these latter surfaces are substantially parallel to inside surface 46a of tab 46 and substantially perpendicular to inside surfaces 44a and 48a of tabs 44 and 48.

To place holographic element 50 in frame 10, border portion 12 is moved to its open position, and the holographic element is placed inside that frame, with one edge of the holographic element against both first and second reference tabs 40 and 42. Then, holographic element 50 is slid along those two reference tabs 40 and 42 until the holographic element is brought against third reference tab 44. After this, border portion 12 is returned to its closed position, bringing pressure tabs 46 and 48 against holographic element 50. Pressure tab 46 forces holographic element 50 against reference tabs 40 and 42, and pressure tab 48 forces the holographic element against reference tab 44, securely holding the holographic element in place against those reference tabs.

Using tabs 40, 42, 44, 44, 46 and 48 to position and hold holographic element 50 in frame 10, as opposed to seating the holographic element directly against border portion 12, substantially reduces the chances that a small bump, projection, or similar imperfection on the perimeter of the holographic element will interfere with the position of the holographic element in the frame, or cause the holographic element o chip, crack or break as it is positioned therein. To elaborate, if any such bump rests directly against a surface of rame 10, the bump may affect the position of holographic element 50 therein; and if any bump on the perimeter of the holographic element is rubbed across a surface of the frame, there is a chance that the holographic element may crack or chip. Tabs 40, 42, 44, 46 and 48 keep holographic element 50 spaced from the much larger inside, longitudinally extending surfaces of legs 20, 22, 24 and 26, and significantly decreases the chances that any bumps or projections on the edge of the holographic element will come into contact with any surfaces of frame 10 as the holographic element is placed and held in the frame.

Moreover, the use of two spaced apart and aligned reference tabs 40 and 42, as described above, substantially helps to initially position holographic element 50 in a particular orientation in frame 10, and to thereafter move the holographic element in a straight line along those tabs into its final position, against third reference tab 44, without any need to observe visually or to check the alignment or movement of the holographic element in the frame 10. Hence, it is comapratively easy for an operator to position holographic element 50 in frame 10 in near or complete darkness.

Figure 5:
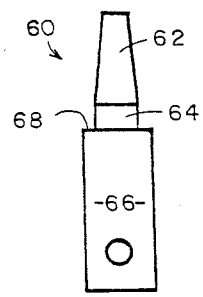
FIG. 5 is a side view of a tool that may be used to spread the frame of FIGS. 1-4 from the closed position to the open position.
Figure 6:
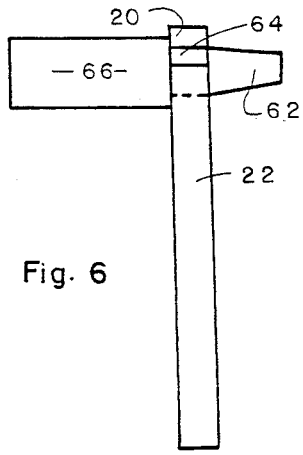
FIG. 6 is a side view showing the tool inserted into the frame of FIGS. 1-4.
Figure 4:
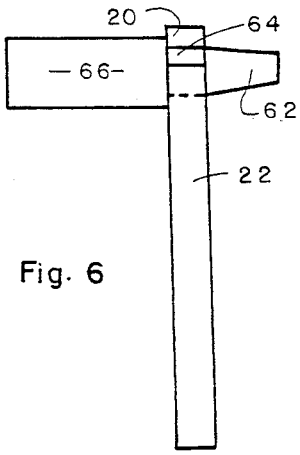
FIG. 4 is another enlarged side cross-sectional view taken along line IV—IV of FIG. 2.

Preferably, border portion 12 of frame 10 includes a pair of openings 54 and 56, each one located on a different side of split 52, adapted to receive a tool to spread the border portion from its closed position to its open position. For example, as shown in FIGS. 1 and 2, openings 54 and 56 may be located directly opposite each other, in opposite edges of legs 20 and 22, to form a common through opening in border portion 12. FIGS. 5 and 6 show a tool 60 that may be used with these openings to open border portion 12; and generally tool 60 includes front, frusto-conical portion 62, cylindrical portion 64 extending rearward therefrom, and handle portion 66 extending rearward from the cylindrical portion.

The front end of frusto-conical portion 62 is small enough to fit into openings 54 and 56 when border portion 12 is in its closed position; and, in use, this end of tool 60 is pushed forward, through openings 54 and 56 so that the frusto-conical portion of the tool engages edges of those openings and pushes those edges away from each other, spreading border portion 12 from its closed position to its open position. After frusto-conical portion 62 is pushed completely through the openings 54 and 56, tool 60 is pushed further forward so that cylindrical portion 64 is inserted into openings 54 and 56. The frictional contact between cylindrical portion 64 and the edges of openings 54 and 56 holds tool 60 in place within those openings, holding border portion 12 in its open position. With border portion held in its open position, it is comparatively easy for an operator to place a holographic element in frame 10 or to remove a holographic element therefrom. Handle portion 66 is provided to help manipulate tool 60, and a forward portion of the handle radially projects outside cylindrical portion 64 and, in this way, forms a shoulder 68 to stop forward movement of tool 60 through openings 54 and 56.

Figure 7:
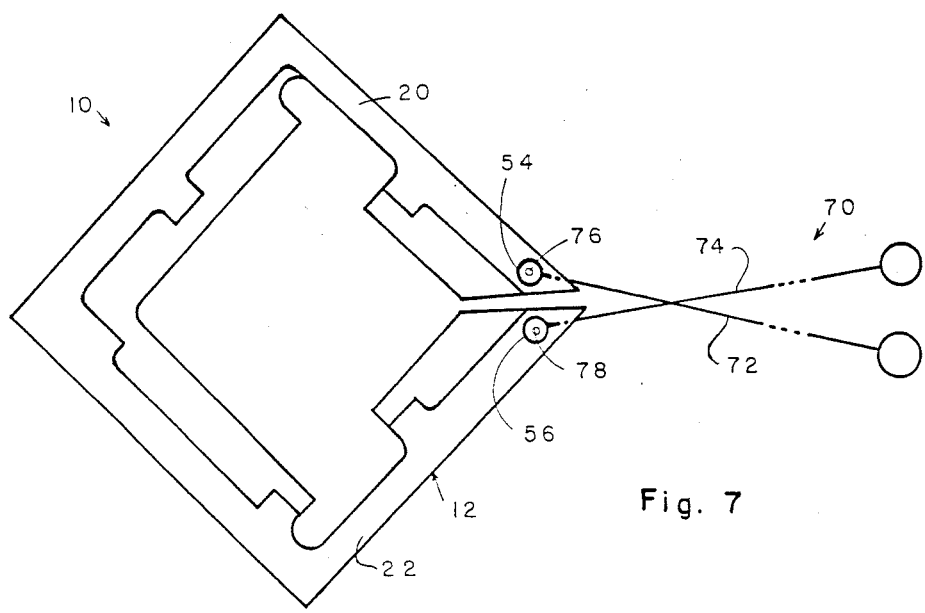
FIG. 7 is a plan view of an alternate frame, and also schematically showing a tool that may be used to spread this frame from a closed position to an open position.

FIG. 7 shows an alternate embodiment of border portion 12, where the openings, 54 and 56 are spaced apart. Specifically, opening 54 is located in leg 20, adjacent yet spaced from the edge of this leg that is opposite leg 22; and opening 56 is located in leg 22, adjacent yet spaced from the edge thereof that is opposite leg 20. FIG. 7 also shows a scissor-type tool 70 that may be used with these openings 54 and 56 to move this border portion 12 into its open position; and, generally, tool 70 includes a pair of arms 72 and 74 pivotally connected together intermediate their ends, and a pair of pins 76 and 78 mounted on first ends of these arms and adapted to be inserted into openings 54 and 56. In use, pins 76 and 78 are inserted into openings 54 and 56, and the front ends of arms 72 and 74 are pivoted apart to force and to hold openings 54 and 56 away from each other, to thereby force the border portion 12 into, and to hold it in, its open position. With border portion 12 held in this open position, an optical element may be placed in or removed from frame 10. Then, the force applied to tool 70 to hold border portion 12 in its open position, is released, and the border portion flexes back into the closed position.

After a holographic element is secured in frame 10, the frame itself may be secured in a host holographic system in any suitable way. Border portion 12 of frame 10 may be securely and tightly gripped by appropriate holding equipment without that equipment scratching or otherwise damaging the optical element. Preferably, at least one of the outside edges of frame 10 is flat and smooth so that the frame may be quickly and accurately positioned in a host holographic system by simply sliding the frame along a guide element or member thereof. Also, preferably, frame 10 includes at least two outside edges, for example edges 24a and 26a, at a precise angular orientation relative to each other, and which thus may be used as reference edges to facilitate positioning frame 10 in a host system.

Frame 10 may be used to position and hold a holographic recording medium in a holographic fabrication system, and after the desired exposure or exposures have been made on that medium, the frame-recording medium assembly is removed from the recording system, and processed with the appropriate developers, fixers and washes to produce, for example, either a holographic lense or a matched filter. When dry, the frame-filter or frame-lense assembly can then be mounted in an optical correlator system in the same way and with the same precision with which it was mounted in the fabrication system. Frame 10 may be reused with a number of different holographic elements;

but, also, a particular holographic element may be permanently secured to a particular frame, if desired, by placing a suitable bonding agent in one or more of the recesses 80 formed between the frame and the holographic element.

Frame 10 may be made in any suitable way, and preferably all the parts thereof are integrally connected together. For example, frame 10 may be made via a stamping process or by means of an injection molding technique. If desired or necessary, the surfaces and edges of frame 10 may be machined to obtain the desired degree of smoothness, and outside edges of the frame may be metal clad or provided with studs to assist mounting the frame in a host holographic system. Frame 10 may be designed for any size or shape holographic element, and may be made from any suitable material. Preferably, frame 10 is transparent and is made from a material, such as lexan, polymethyl, or methacrylate, that will withstand the chemicals used to process exposed recording mediums.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A one piece frame for holding a holographic element in a holographic system, comprising:
   a border portion forming an outside border of the frame, and being flexible between an open position for receiving the holographic element, and a closed position for holding the holographic element in the frame;
   a seating portion connected to and extending inward from the border portion to seat against a back surface of the holographic element; and
   a plurality of lateral positioning tabs connected to and extending inward from the border portion, above the seating portion, the lateral positioning tabs being spaced apart from each other and along the border portion to apply upward, downward, leftward and rightward forces to the holographic element to force said element into, and to hold the holographic element in, a centered position in the frame and spaced from said border portion thereof;
   the border portion being biased toward the closed position to hold the holographic element against the lateral positioning tabs in a fixed position in, and with a great angular orientation relative to, the frame, and to cooperate with the holographic element to maintain the frame in a fixed preset shape to facilitate placing and holding the holographic element in a precise location and orientation in the holographic system.

2. A holographic frame according to claim 1 wherein the plurality of lateral positioning tabs includes:
   first and second reference tabs to engage a first side of the holographic element;
   a third reference tab to engage a second side of the holographic element;
   a first pressure tab to engage a third side of the holographic element, opposite the first and second reference tabs; and
   a second pressure tab to engage a fourth side of the holographic element, opposite the third reference tab.

3. A frame according to claim 2 wherein:
   the first pressure tab is positioned symmetrically opposite the first and second reference tabs; and
   the second pressure tab is positioned directly opposite the third reference tab.

4. A frame according to claim 2 wherein:
   the border portion has a rectangular shape, and includes first, second, third and fourth legs;
   the seating portion includes
   (i) a first surface extending inward from the first leg,
   (ii) a second surface extending inward from the second leg,
   (iii) a third surface extending inward from the third leg, and
   (iv) a fourth surface extending inward from the fourth leg.

5. A frame according to claim 4 wherein:
   each of the first, second, third and fourth legs has a longitudinal axis;
   the first pressure tab extends inward from the first leg, substantially midway along the longitudinal axis thereof;
   the second pressure tab extends inward from the second leg, substantially midway along the longitudinal axis thereof;
   the first and second reference tabs extend inward from the third leg and are equally spaced from the center of the longitudinal axis of the third leg; and
   the third reference tab extends inward from the fourth leg, substantially midway along the longitudinal axis thereof.

6. A frame according to claim 5 wherein:
   the first seating surface laterally projects directly inward of the first pressure tab;
   the second seating surface laterally projects directly inward of the second pressure tab;
   the third seating surface laterally projects directly inward of the first and second reference tabs; and
   the fourth seating surface laterally projects directly inward of the third reference tab.

7. A frame according to claim 4 wherein the first and second legs are split apart to facilitate moving the border poriton from the closed position to the open position.

8. A frame according to claim 7 wherein:
   the first leg includes a first opening;
   the second leg includes a second opening; and
   the first and second openigns are adapted to receive a tool to spread the first and second legs apart and move the border portion from the closed position to the open position.

9. A frame according to claim 8 wherein:
   the first opening extends through an edge of the first leg, adjacent the second leg; and
   the second opening extends through an edge of the second leg, opposite the first opening.

10. A frame according to claim 7 wherein:
    the first leg includes a first edge adjacent the second leg, and the firs topening is spaced from said first edges; and
    the second leg includes a second edge, opposite the first edge of the first leg, and the second opening is spaced from said second edge.

11. A frame according to claim 7, wherein the first and second legs are substantially perpendicular to each other both when the border portion is in the closed position and when the border portion is in the open position.

12. A frame according to claim 2, wherein each of the lateral positioning tabs includes an inside surface slanting forwardly inwardly to project forward of the holographic element and to positively capture the holographic element between the seating portion and the lateral positioning tabs.

13. A frame according to claim 1 wherein the border portion, the seating portion, and the lateral positioning tabs are all integrally connected together.

14. A frame according to claim 13 wherein the frame is transparent.

15. A combination frame for holding a holographic element in a holographic system, and tool for opening the frame, the frame comprising
   (i) a border portion forming an outside border of the frame, being flexible between an open position for receiving the holographic element and a closed position for holding the holographic element in the frame, and including first and second openings,
   (ii) a seating portion connected to and extending inward from the border portion to seat against a back surface of the holographic element, and
   (iii) a plurality of lateral positioning tabs connected to and extending inward from the border portion, above the seating portion, and spaced apart from each other along the border portion to hold the holographic element therein spaced from said border portion; and
   the tool comprises means adapted to be inserted into the first and second openings to spread the border portion from the closed position to the open position.

16. A combination according to claim 15 wherein:
   the first and second openings are opposite each other and form a common through opening; and
   the tool comprises
   (i) a lead conical portion adapted to fit into the through opening to spread the border portion from the closed position to the open position,
   (ii) an intermediate cylindrical portion extending rearward from the conical portion, to hold the border portion in the open position, and
   (iii) a shoulder located rearward of the cylindrical portion, to stop movement of the tool through the through opening.

17. A combination according to claim 16 wherein the tool further includes a handle portion extending rearward from the cylindrical portion to facilitate handling the tool, and the handle portion includes a forward surface forming the shoulder.

18. A combination according to claim 15 wherein:
   the first and second openings are spaced apart from each other; and
   the tool comprises
   (i) first and second arms,
   (ii) a first pin secured to the first arm and adapted to be inserted into the first opening, and
   (iii) a second pin secured to the second arm and adapted to be inserted into the second opening,
   the first and second arms being connected together for pivotal movement to spread the border portion from the closed position to the open position.

* * * * *

UNITED STATES PATENT AND TRADEMARK OFFICE
CERTIFICATE OF CORRECTION

PATENT NO. : 4,802,718

DATED : February 7, 1989

INVENTOR(S) : Kenneth G. Leib

It is certified that error appears in the above-identified patent and that said Letters Patent is hereby corrected as shown below:

Column 2, line 9: "drak" should read as --dark--

Column 4, line 22: "form" should read as --from--

Column 5, line 25: "rame" should read as --frame--

Column 5, line 46: "comapratively" should read as --comparatively--

Column 7, line 51: "great" should read as --preset--

Column 8, line 43, Claim 7: "poriton" should read as --portion--

Column 8, line 48, Claim 8: "openigns" should read as --openings--

Column 8, line 59, Claim 10: "firs topening" should read as --first opening--

Column 8, line 60, Claim 10: "edges" should read as --edge--

Signed and Sealed this

Tenth Day of October, 1989

*Attest:*

DONALD J. QUIGG

*Attesting Officer*          *Commissioner of Patents and Trademarks*